April 2, 1929. W. J. GIBBONS 1,707,931
NUT AND BOLT LOCKING DEVICE
Filed Dec. 2, 1927
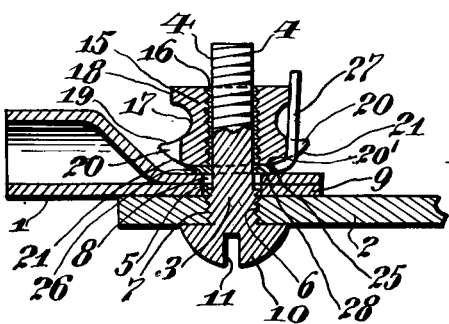
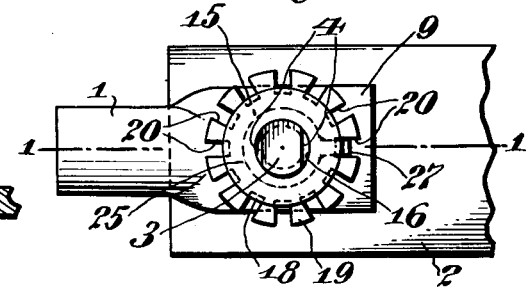
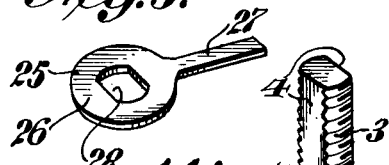
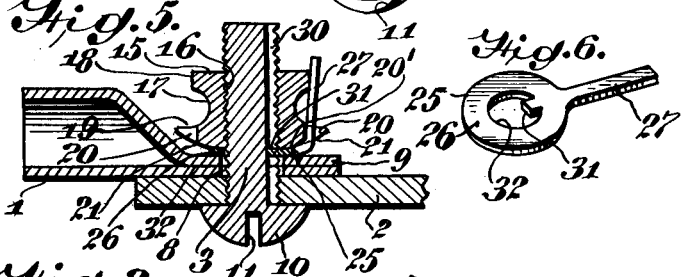
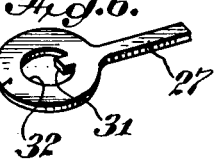
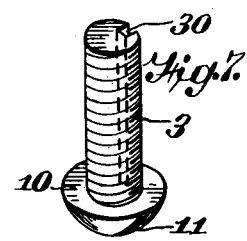
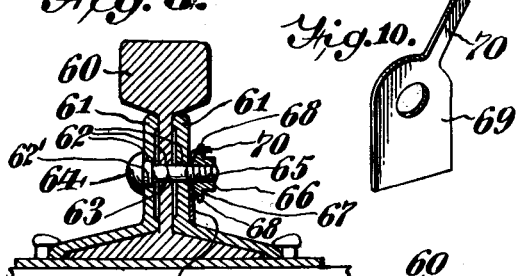
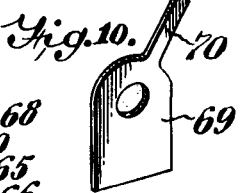
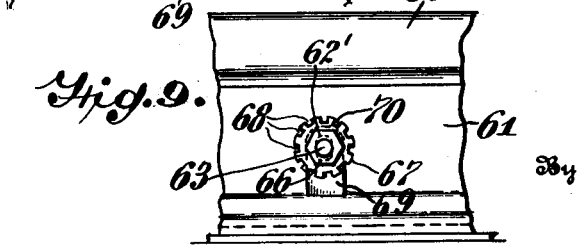
Inventor
William J. Gibbons
By Cyrus N. Anderson
Attorney Patented Apr. 2, 1929.

1,707,931

UNITED STATES PATENT OFFICE.

WILLIAM JAMES GIBBONS, OF PHILADELPHIA, PENNSYLVANIA.

NUT AND BOLT LOCKING DEVICE.

Application filed December 2, 1927. Serial No. 237,209.

My invention relates to nut and bolt locking devices of a character such that they are particularly well adapted for use in connection with the binding screws or posts employed in fastening members of electrical connections together, but also is of such character that it may be used in connection with other devices in which locking means is desirable for locking nuts and bolts and screws and the like together.

The general object of the invention is to provide a nut and bolt or screw locking means of simple construction and of a character such that its application in use is facilitated.
A further object of the invention is to provide a nut and bolt or screw locking means in which the nut is of a formation specially adapting it for co-operation with an engaging means whereby the nut and the bolt to which it is applied may be secured together against relative rotation.

To these and other ends the invention comprehends the construction and arrangement of parts as hereinafter described in detail and particularly pointed out in the claims.

In order that the invention may be readily understood and its simplicity and utility fully appreciated, reference should be had to the accompanying drawing in which I have illustrated various forms of embodiment of the invention. It is to be understood, however, that the invention is susceptible of embodiment in other forms of construction than those shown and that various changes in the details of construction of different forms of the device may be made within the scope of the claims without departing from the principle of the invention.

In the drawing:
Fig. 1 is a longitudinal sectional view of electric contact devices connected together by a nut and screw provided with locking means embodying my invention, the said view being taken on the line 1—1 of Fig. 2;
Fig. 2 is a top plan view of the structure shown in Fig. 1;

Fig. 3 is a view in perspective of the locking device to be associated with the nut and screw;
Fig. 4 is a view in perspective of the screw shown in Figs. 1 and 2;

Fig. 5 is a view similar to that shown in Fig. 1, but showing a modified construction of screw and locking device associated therewith;

Fig. 6 is a view in perspective of the locking device shown in Fig. 5;

Fig. 7 is a view in perspective of the screw shown in Fig. 5;

Fig. 8 is a transverse sectional view of a rail of a railway track showing a nut and bolt employed in the fastening of fish plates in place thereon provided with nut and bolt locking means embodying the invention;

Fig. 9 is a view in side elevation looking from the right toward the left in Fig. 8; and Fig. 10 is a view in perspective of the locking device associated with the nut and bolt shown in Figs. 8 and 9.

In Figs. 1 to 10 of the drawing I have shown the nut and bolt locking means embodying my invention as being associated with and constituting a part of the nuts and screws employed in the fastening of the terminal of an electric conducting line to a connecting plate, which plate in turn may have connection with a switch structure or may be otherwise related.

In the Figs. 1 to 7 of the drawing, I have shown terminals 1 of usual construction and plates 2 to which they are connected by fastening means, each of which includes a screw or binding post.

In Figs. 1 to 4 of the drawing the headed screw 3 is flattened on two sides as indicated at 4 so that for the greater portion of its length it is of general rectangular shape. The flattened portions 4 terminate as indicated at 5 so that a circular screw threaded portion 6 is left which is in screw threaded engagement with a screw threaded opening 7 in the plate 2. The opening 8 through the flattened portion 9 of the terminal 1 is of a size to permit the insertion of the screw 3 therethrough. The head 10 of the screw is provided with a slot 11 of usual character. The nut 15 is provided as usual with a circular tapped opening 16 and the said nut also is provided upon its outer side with an annular intermediate groove 17, the presence of which forms the annular flange like portions 18 and 19 at the top and bottom respectively thereof. The diameter of the top of the said nut is less than that of the bottom portion thereof. The entire peripheral portion of the flange 19 is provided with notches or slots 20 located in adjoining spaced relation to each other as shown in Fig. 2. The bottom side of the nut 15 is provided with an annular flat portion as indicated at 20' which is adapted to contact with a washer as shown, which will be hereinafter referred to and described in detail.

The remaining portion of the bottom side of the said nut outside of the said flat portion is beveled or inclined upwardly as indicated at 21. The surface of the said upwardly inclined or beveled portion is of spherical form. The notches 20 are of a depth such that the lower ends of their bottoms are located a distance from the outer edge of the flat portion 20′ as is clearly shown in Fig. 1 of the drawing.

A locking device 25 of thin flexible sheet metal is located between the nut 15 and the adjoining flat portion 9 of the terminal 1. The said locking device comprises a circular portion 26 having a radially extending tongue 27 which projects from the edge thereof. The circular portion 26 is provided with an opening 28 of the shape of the cross sectional area of the flattened portion of the screw 3 and of a size to permit the insertion of the screw therethrough. The opening 28 being substantially of oblong shape as illustrated it follows that when the correspondingly shaped portion of the screw 3 is located therein there cannot be relative rotation between the two. The circular portion 26 of the locking device is adapted to be clamped between the flat portion 20′ of the nut and the flat portion 9 of the terminal 1. When the nut is screwed down into position as illustrated in Figs. 1 and 2, the tongue 27 is then turned up into engagement with one of the notches 20 in the edge of the flange 19. The relation of the tongue 27 to the flange and to the notch 20, within which it is located, is clearly shown in Fig. 1 of the drawing by reason of the fact that the portion of the inclined surface between the bottom of the said notch 20 and the edge of the flat portion 20′ is inclined and preferably of spherical shape as described. It follows that the bends formed in the tongue 27 which result from the bending of the same up into a notch 20 as shown are less sharp than would be the case if the bottom of the nut were flat. In the latter event the turning of the tongue up into engagement with a notch would result in the formation of a single sharp bend therein which would be more apt to result in the breaking thereof, than is the case with a construction of nut having a bottom surface such as I have illustrated. A further advantage resulting from the provision of the rounded surface on the under side of the nut resides in reducing to a minimum the angle through which the tongue must be bent in fastening and unfastening the said nut, thereby further lengthening the life of the locking device. Thus it will be apparent that the nut may be rotated without the necessity of flattening the tongue 27 with relation to the annular portion of the locking device; in other words, the nut may be rotated while the tongue remains bent at an angle.

After a nut has been screwed down upon the screw 3 so as to clamp the locking member and the members 1 and 2 together as shown in Fig. 1, the tongue is then turned upwardly into engagement with any one of the notches 20 which happen to be located directly above the said tongue. These notches are placed as close together as is practically possible so that practically no matter what the position of the nut may be when it reaches its final fastening or clamping position, one of the said notches will be in position to receive the tongue 27 when it is turned upwardly into the position shown in Figs. 1 and 2 of the drawing. The metal of the locking device 25 should be of such character that when the tongue is turned up into the position as shown in Figs. 1 and 2, it will remain in such position and should be of a character such that when turned back into position out of engagement with the notch 20, it will not break.

The presence of the annular groove 17 facilitates the turning of the tongue 27 downwardly from the upright position as shown in Fig. 1, because it permits the insertion of a pointed instrument between the nut and the said tongue. In case the tongue extends above the top of the nut as shown in Fig. 1, the use of such an instrument may not be necessary, but in many cases it will be found that the tongue will terminate at a point below the top of the nut. In that event, the presence of the annular groove 17 will be found of great advantage.

The construction as illustrated in Figs. 5 to 7 inclusive, is identical with that shown in Fig. 1 except as to the shape and construction of the screw or screw bolt and consequently the same reference letters as far as applicable are employed to designate the different parts of this construction. In these Figs. 5 to 7, the screw is of circular shape in cross section, but is provided with a channel or groove 30 which extends lengthwise thereof and is adapted to receive a projection 31 which extends inwardly from the edge of the opening 32 in the circular portion 26 thereof. After the nut 15 of this construction is screwed down into place to clamp the parts together as described in connection with the construction illustrated in Figs. 1 and 2, the tongue 27 is turned upwardly into one of the notches 20 as is clearly shown in Fig. 5 and when in such position it is apparent that relative rotation or turning of the nut and screw is prevented, the same as is the case in the construction shown in Figs. 1 and 2.

In Figs. 8 and 9 of the drawing I have shown my invention as applied to nuts and bolts employed in the fastening of fish plates in place over the joints of the rails of railway tracks. In these figures of the drawing, I have shown a rail 60 in cross section and have also shown fish plates 61 in cross section, the web of the said rail and the adjoining portions of the fish plates having openings 62 therethrough as shown, which openings are in registry. The opening 62 in one of the fish plates should not be round and may be oblong in shape as shown at 62'. The fastening bolt 63 extends through these openings. The bolt 63 is provided at one end with a head 64 and adjoining the said head the bolt is oblong in cross section. When the said oblong portion is within the oblong opening 62' rotation of the bolt is prevented. The other end of said bolt is screw threaded as indicated at 65 for the reception of a binding or fastening nut 66. The nut 66 is provided at its inner edge or underside with an annular flange 67 provided with a series of notches 68. The bottom or underside of said nut is identical in shape with the underside of the nut 15 shown in previous figures of the drawing. A locking device 69 is located between the nut 66 and the outer side of the adjoining portion of a fish plate 61. The said locking device consists of thin sheet metal of suitable flexible character. One end of the locking device is seated either against a lower outwardly extending flange of the fish plate, as shown; or if the said plate be not provided with such a flange then the lower end of the said locking device will be seated against the upper side of one of the bottom flanges of the rail as shown.

The said locking device is provided with a tongue 70 which after the nut has been tightened so as to clamp the rail and the fish plates together, is turned outwardly and laterally as shown in Fig. 8 into engagement with one of the notches 68. When the tongue is so engaged with one of the said notches it is apparent that the nut cannot be rotated with respect to the bolt.

It will be seen from the drawing and from the foregoing description that means constituting my invention is adapted to be embodied in nut, bolt and screw structures of various kinds.

It will also be seen that my invention is simple in character and in addition to the ease with which it may be employed and applied is of great utility in that it constitutes a means for positively preventing relative rotation between nuts and bolts after the nuts have been tightened to clamp any two or more objects or parts together.

Having thus described my invention what I claim and desire to secure by Letters Patent is:

1. In nut and bolt locking means the combination of a member having an opening therethrough through which the said bolt extends, said member having a projection extending inwardly of the said opening which is in engagement with the said bolt to prevent rotation of the said bolt with respect to the said member and the said member having a tongue extending outwardly from its edge, and a nut having a series of notches around its lower edge portion, said nut having an annular groove formed in said nut, the said tongue being adapted to engage with one of said notches and to extend across said annular groove whereby a tool may be inserted between the said nut and the said tongue to disengage the latter from one of the said notches.

2. In nut and bolt locking means, the combination of a flexible plate member having an opening therethrough through which a bolt extends, said member having a tongue extending outwardly from the edge thereof, and a nut in engagement with the said bolt, the said nut having an annular groove in its periphery intermediate the upper and lower ends thereof the presence of said groove forming in adjoining relation to the lower end of the said nut a flange, which flange is provided with a series of notches in adjoining relation to each other, and the said tongue being adapted to be placed in engagement with any one of the said notches and to extend across said annular groove whereby a tool may be inserted between the said nut and the said tongue to disengage the latter from one of the said notches.

3. In nut and bolt locking means, the combination of a member having an opening therethrough through which a bolt is extended, means provided intermediate the said bolt and said member whereby the member is interlocked with the said bolt to prevent relative rotation between the two, and the said member being provided with an outwardly extending tongue, a nut having a flange upon its lower end the lower outer entire peripheral edge of which flange is rounded, the said flange being provided with a series of notches in adjoining relation to each other with any one of which the said tongue is adapted to be engaged, the said tongue being of sufficient length to extend beyond the upper surface of said flange to provide means whereby the said tongue may be manipulated to bend the same into engagement with one of said notches to positively prevent rotation of the said nut.

4. In locking means of the character described, the combination of a screw having a groove extending longitudinally thereof, a locking device comprising a portion having an opening therethrough, from the edge of which a projection extends inwardly thereof and the said screw projecting through the said opening, the said projection extending into the said groove, a nut having a tapped opening in engagement with the said screw, said nut having an annular channel upon its outer side intermediate its ends, the said channel forming an annular flange at the lower end of the said nut, the bottom of said nut having an annular flat portion in adjoining relation to its tapped opening and an upwardly extending spherical portion extending from the entire outer edge of the said flat portion, the said flange upon the lower end of said nut having a series of notches therein, and the said locking device having a tongue extending outwardly from the edge thereof of sufficient length to extend beyond the upper surface of said flange and across the said channel to provide means whereby the said tongue is adapted to be manipulated to engage the same with any one of the notches in the said flange to positively prevent rotation of the said nut, the said channel constituting means for permitting a tool to be inserted between the said tongue and the said nut to disengage the said tongue from one of the said notches.

5. In nut and bolt locking means the combination of a screw and nut and a plurality of members secured together thereby, the outer portion of the under side of said nut being rounded throughout its entire peripheral extent, a plurality of notches formed in said nut, a locking device interposed between the under side of said nut and one of said members, said locking device being provided with means for engaging said screw to prevent rotation of said locking device relative thereto, and a tongue formed on said locking device adapted to be bent into engagement with the rounded portion of said nut and to be extended into one of said notches to positively prevent rotation of said nut the said tongue being of sufficient length to permit the free end thereof to be manipulated to bend the said tongue into and out of engagement with one of said notches.

6. In nut and bolt locking means the combination of a screw and a nut and a plurality of members secured together thereby, the outer portion of the under side of said nut being rounded throughout its entire peripheral extent, a plurality of notches formed in said nut, and means adapted to interlock with said screw, said means having a tongue formed thereon adapted to be bent into engagement with the rounded portion of said nut and to extend into one of the notches formed in said nut to positively prevent rotation of the latter, the rounded portion of said nut constituting means for preventing fracture of the said tongue in the region of bending thereof and to permit rotation of the said nut when the said tongue is in bent condition.

In testimony that I claim the foregoing as my invention I have hereunto signed my name this 29th day of November A. D., 1927.

WILLIAM JAMES GIBBONS.